United States Patent [19]

Rocca

[11] Patent Number: 4,937,832

[45] Date of Patent: Jun. 26, 1990

[54] METHODS AND APPARATUS FOR PRODUCING SOFT X-RAY LASER IN A CAPILLARY DISCHARGE PLASMA

[76] Inventor: Jorge J. Rocca, 924 Driftwood Dr., Ft. Collins, Colo. 80525

[21] Appl. No.: 374,369

[22] Filed: Jun. 30, 1989

[51] Int. Cl.$^5$ .............................................. H01S 3/30
[52] U.S. Cl. .......................................... 372/5; 372/38; 372/76; 372/69; 372/87; 372/37
[58] Field of Search ................... 372/76, 5, 56, 86, 87, 372/37, 38, 69

[56] References Cited

U.S. PATENT DOCUMENTS

| | | | |
|---|---|---|---|
| 3,947,781 | 5/1976 | Hernqvist | 372/34 |
| 4,555,787 | 11/1985 | Cohn et al. | 372/5 |
| 4,589,113 | 5/1986 | Hagelstein | 372/76 |
| 4,862,476 | 8/1989 | Yiming | 372/61 |

OTHER PUBLICATIONS

Sclfrast et al.; "$CO_2$—Laser Produced Plasma—Initiated Neutral Gas Recombination Lasers"; J. Appl. Phys. 50 (12), Dec. 1979.

Primary Examiner—Léon Scott, Jr.
Attorney, Agent, or Firm—Dorr, Carson, Sloan & Peterson

[57] ABSTRACT

The generation of soft x-ray and/or extreme untraviolet laser radiation is accomplished in a capillary plasma generated by a fast discharge. The method yields laser action at short wavelengths in a discharge created plasma having a large length-to-diameter ratio.

46 Claims, 2 Drawing Sheets

METHODS AND APPARATUS FOR PRODUCING SOFT X-RAY LASER IN A CAPILLARY DISCHARGE PLASMA

BACKGROUND OF THE INVENTION

Many scientific and technological applications will benefit from useful and practical sources of laser radiation in the soft x-ray and/or extreme ultraviolet spectral regions. While lasers operating at longer wavelengths have existed for many years, it was not until recently that soft x-ray lasers were successfully operated. However, those soft x-ray lasers recently demonstrated are very large apparatus requiring as the excitation source very large energy lasers, typically delivering laser pulses of hundreds of Joules to kilojoules at longer wavelengths. The cost, complexity, and size of the equipment required to form such x-ray laser apparatus make them impractical for most technical and scientific applications. Hence, a soft x-ray laser apparatus of approximately the size of current table top ultraviolet excimer lasers would find many commercial as well as scientific applications.

Soft x-ray lasers operating at wavelengths of less than 500 Angstroms have currently been demonstrated by: (a) the use of kilojoule Nd-Glass lasers to create highly ionized plasmas from solid targets such as Selenium and (b) the use of $CO_2$ lasers with pulse energies of several hundred Joules to excite highly ionized plasmas from solid targets.

It should also be noted that x-ray radiation has been generated by either one of the following types of excitation processes, (i) Electron impact excitation In this case energetic electrons from laser created plasmas collide with ions of a certain charge state and excite these ions to create a population inversion between two excited levels of this specie. What follows as a result is common to the operation of most other lasers: the process of stimulated emission causes the radiation corresponding to the wavelength of the radiative transition that links the two levels to amplify in intensity as it travels through the medium.

(ii) Electron ion recombination

A laser created plasma rapidly cools at the end of the excitation pulse by either adiabatic expansion, radiation or electron heat conduction. The rapid decrease in the plasma temperature causes the electrons and ions from the plasma to recombine, creating population inversion between excited levels of the lesser charge ions that result from the recombination process. Again radiation with a photon energy corresponding to the energy difference between the inverted levels is amplified.

A third method in which a laser also is used as an excitation source has also been recently used to generate laser radiation at wavelengths in the vicinity of 1000 Angstroms.

(iii) Excitation of core excited states

In this case short laser pulses in the picosecond to nanosecond range are used to bombard a solid target and produce a powerful incoherent soft x-ray flash lamp. These x-rays are made to interact with a gaseous or metal vapor target producing population inversions by photoionization in core excited states, or creating a plasma in which hot electrons produce inversions by electron impact excitation.

An important aspect of the difficulty in constructing x-ray lasers is the requirement of a powerful energy source capable of depositing very high power densities. In all the methods described above a laser is used as such energy source. Higher power density deposition is achieved by focussing the laser beams with lenses or mirrors and hence they are used to generate plasmas that are used in the ways described above to produce the amplification of soft x-ray or extreme ultraviolet radiation.

The capillary discharge method and apparatus described herein allows a more direct conversion of electrical energy into short wavelength laser radiation, without the need of going through the process of converting electrical energy into long wavelength laser radiation, and then using the short wavelength laser radiation to create a plasma from which the x-ray laser light originates. This represents a very significant improvement with respect to the complexity, size and efficiency of such devices.

The advantage of being able to use a capacitor as an energy source to excite the plasma can be visualized when one realizes that while a kilojoule laser fills an entire room, a capacitor storing the same energy is of the size of a small briefcase.

SUMMARY OF THE INVENTION

Fast discharges through a capillary, that is to say through a capillary tube-like configuration ("capillary geometry"), having a large length-to-diameter ratio has certain fundamental properties which are ideally suited to generate plasmas that can be used to amplify soft x-ray and/or extreme ultraviolet laser radiation (e.g., radiation having wavelengths between about 100 and 1,000 Angstroms). In such a capillary geometry, highly ionized plasmas can be created with modest excitation energy. Preferably the capillary will comprise a tube-like structure whose length is from about 20 to about 1,000 times the diameter of the capillary tube-like structure. In the most preferred capillary geometries, the length of the capillary tube will be from about 100 to about 200 times the diameter of the capillary. Capillary diameters of from about 20 microns to about 2 millimeters are preferred and capillary diameters of about 100 to about 200 microns are most preferred. The energy from a high voltage transmission line (i.e., a line, having small impedance) and/or from capacitor is discharged through the capillary and thereby producing a plasma by ionizing material which is ablated from the surface of the capillary's inner walls. As an alternative or adjunct to this ablation process, an ionizing gas might be introduced in the capillary.

In any case, a low inductance circuit configuration is used to allow for high power energy deposition. During discharge of a current pulse, an intense self generated magnetic field helps confine the plasma and achieve a high degree of ionization. The resulting small diameter of the resulting capillary plasma allows for avoidance of trapping of lower laser level radiation by resonant absorption in the radial direction. Hence, the laser's lower levels can be depopulated by radiative decay.

Another important advantage of this capillary discharge geometry is the large rate of electron heat conduction to the capillary walls; this condition promotes generation of population inversions which are created by electron-ion recombinations hereinafter described.

Electron-ion recombination lasers in capillary discharges.

The generation of population inversions by electron-ion recombination is the one of the most useful mechanisms to create population inversions in a capillary plasma. In this scheme the ions created by an energetic discharge current pulse act as an energy storage media with a relatively long lifetime. Hence, a current pulse lasting from several nanoseconds to several tens of nanoseconds is adequate to generate the required plasma. Fundamental to the implementation of the soft x-ray recombination laser is a rapid cooling provided to the capillary plasma by electron heat conduction to the capillary walls, and by radiation.

At the end of the current pulse, large electron heat conduction from the hot plasma to the capillary walls adds to other heat losses, such as radiative losses, to rapidly cool the plasma, inducing large electron-ion recombination rates. The capillary geometry enhances the electron heat conduction cooling rate by the close proximity of the walls to the plasma. Radiative losses can be enhanced by adding a heavy atom (high Z atom) to the capillary plasma. That is to say the atom is heavy with respect to the material of the laser atom. For the purposes of this patent disclosure such a heavy atom may be regarded as having an atomic number which is at least twice the atomic number of the laser atom. Such Z atoms can be introduced by doping the capillary walls with a high Z material or by selectively introducing a gas containing high Z atoms. In any case, rapid recombination of highly ionized ions of charge $Z+1$ into excited levels of ions of charge Z induces the generation of population inversions in the ions of charge Z and results in the amplification at soft x-ray wavelengths. For the laser action to occur a plasma density has to be achieved such that a large density of ions with charge $Z+1$ is created. Nevertheless the plasma density has to remain below a maximum value at which collisional electron de-excitation of the laser's upper lever, or trapping of lower laser resonant radiation will destroy the population inversions.

Using the capillary discharge electron-ion recombination scheme of this patent disclosure, laser action can be achieved, for example, in the 3-2 transitions of, hydrogenic ions, such as the 18.2 nm line of Carbon VI, and the 26.2 nm line of Boron V. In these cases the particles responsible for generation of the population inversions are totally stripped atomic nuclei that recombine with electrons to form hydrogenic ions.

An axial magnetic field can be employed to control the ion diffusion and heat conduction rates. For example in the case in which radiation cooling is dominant, a strong axial magnetic field can increase the laser gain by helping to keep the plasma ions confined as the plasma cools.

Other excitation mechanisms for soft x-ray lasers in capillary discharges

Other excitation mechanisms besides electron-ion recombination are also useful for the generation of laser radiation in these capillary discharge apparatus. They include electron impact excitation, core ionization and charge transfer. In the electron impact excitation, discharge conditions are created such that a large density of ions of charge Z are created by the discharge. Energetic electrons present in the capillary plasma will excite, by electron impact, singly or double excited levels of the charge Z ion and thereby generate population inversions. For lasing to occur it is necessary to adjust the discharge conditions (voltage, current, pulse length, capillary diameter and composition) such that both a high electron temperature and a large density of ions of the desired specie of charge Z exist simultaneously. That is to say, the electron temperature values at which significant excitation occurs has to be achieved before the plasma is over-ionized and the ions of the lasing specie Z destroyed. By way of example, soft x-ray amplification can be made to occur in transitions of nickel-like ions (i.e., ions with electronic structures of a neutral nickel atom), such as nickel-like molybdenum at 19.4 nm. Neon-like ions are also a useful type of ions for the generation of soft x-ray laser radiation. Again, the small capillary diameter is important to avoid the destruction of population inversions by resonant trapping of the laser's lower level radiation.

Photoionization can also produce population inversions in a capillary plasma. In this case the hotter plasma region near the axis of the capillary acts as a flashlamp to produce x-ray radiation that can excite or ionize lower ionized atoms, or atoms from a different specie that exist in the cooler plasma region that surrounds the capillary walls. An annular gain region is produced in which extreme ultraviolet and soft x-ray laser action occurs.

Finally, near resonant charge transfer collisions between ionized species of charge Z created by electron impact ionization in the hot region of the plasma near the axis of the capillary discharge can diffuse to the cooler plasma region near the capillary walls, undergoing charge transfer collisions with atoms, or lower ionized species A. An electron is transferred from an atom or ion A into an ion of charge Z, leaving the atom or ion A ionized and the ion Z in a charge state $Z-1$. Those skilled in this art will appreciate that ionization energy of specie A can be selected such that the atom Z is left in a selected excited level with the characteristics necessary to act as a laser upper level, such that a population inversion and amplification of radiation occurs. For the charge transfer rate, and consequently the gain, to be large, the ionization energy of specie A has to closely match the energy difference between the ground state of specie Z and the selected laser upper level in specie $Z-1$. Again, an annular region of positive gain results, defined by the overlap of the A and Z species distributions.

DETAILED DESCRIPTION OF THE INVENTION

A further understanding of the herein disclosed method for the generation of extreme ultraviolet (e.g., below about 1,000 Angstroms) and soft x-ray (e.g., below about 500 Angstroms) radiation can be gained by reference to FIGS. 1 and 2.

Figure 1:
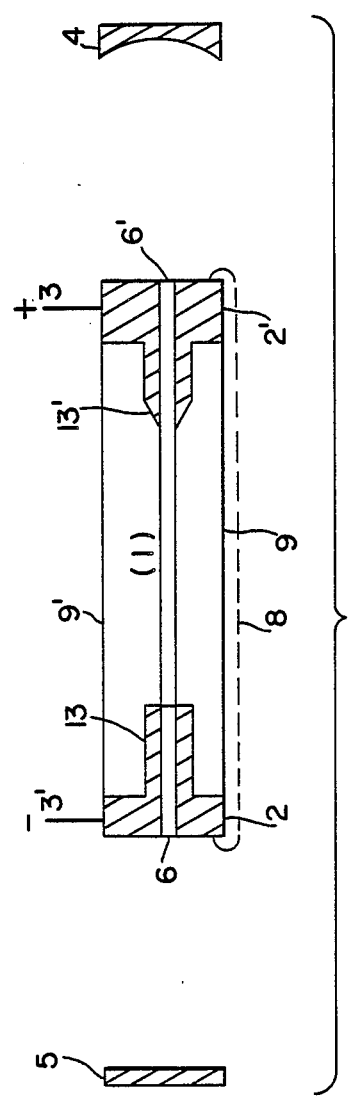

FIG. 1 shows a cross section of the capillary and discharge electrodes. The system has been simplified for clarity. With reference to FIG. 1, a cylindrical capillary 1 which is most preferably made of an electrical insulating material specifically selected for the generation of a plasma. For example if a recombination laser is to be constructed to produce laser radiation at the 18.2 nm line of C VI, the capillary walls can provide the carbon atoms by discharge ablation. In this case a carbon containing plastic material such as polyethylene is adequate for the construction of the capillary. By way of further example, boron nitride can be used to build such a capillary, especially in the case where laser action is to be achieved in boron ions. Two electrodes 2 and 2', made of an electrical conducting material, are placed at the respective ends of such a capillary. One or both of the electrodes 2 and/or 2' has (have) a hole(s) 6 and/or 6' through said electrode, preferably at or near its axis to allow exit of laser radiation. The electrodes are electrically connected to a discharge circuit, that is only illustrated in FIG. (1) by the + and − electrical polarity signs 3 and 3'. It should however be noted that the electrodes are to have a voltage differential and the + and − designations are only terms of relative voltage values. Be that as it may, the power source can be a low inductance capacitor bank, or an electrical transmission line (i.e., an electrical transmission line having a low impedance). One representative implementation of the apparatus is illustrated in FIG. 2.

The electrodes 2 and 2' are preferably provided with protrusions 13 and 13' respectively which protrude into the capillary structure in order that electrical breakdown occurs through the capillary and flashover is avoided in external surfaces. This can also be encouraged by making the distance that separates the electrodes 2 and 2' through the capillary much shorter than any other external path 8 that might connect the two electrodes. External flashover is also avoided by having the external surfaces 9 exposed to transformer oil or to an electronegative gas such as $SF_6$. To this end the apparatus should be enclosed in a pressure vessel (not shown in FIG. 1) which is capable of containing such a gas or maintaining a vacuum condition inside the capillary. Selected gases might be introduced into the pressure by way of a vacuum pump associated with the pressure vessel.

An optical resonator, constituted by two or more reflecting surfaces can be implemented to enhance the amplification of short wavelength radiation in the capillary plasma. One possible implementation of the optical resonator can be obtained by the use of a mirror 4 and a partially reflected beam splitter 5, generally located as illustrated in FIG. 1. The axis of the optical cavity is preferably made coincident with the axis of the capillary.

Figure 2:
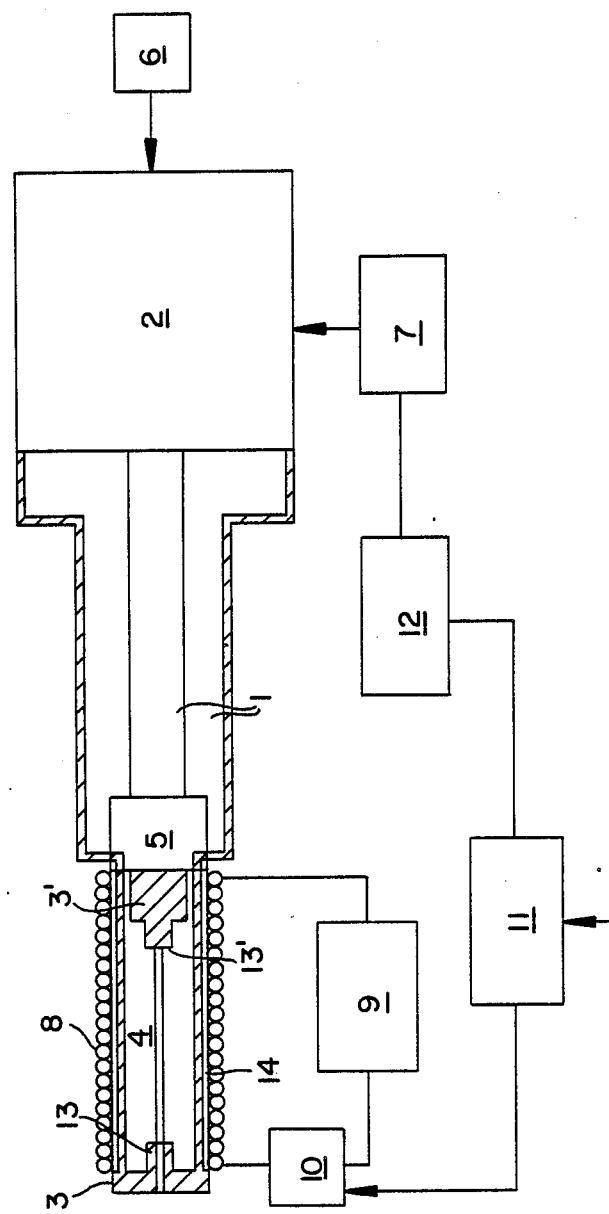

FIG. 2 depicts a representative implementation of a capillary discharge electrical configuration employed according to the teachings of this patent disclosure using, for energy storage, a transmission line 1 charged by a high voltage Marx generator 2. The system has been simplified for clarity and those skilled in this art will appreciate that many such configurations are possible which would be within the scope of this invention. The transmission line 1 is connected to the capillary electrodes 3 and 3' situated at the ends of capillary 4 by a low inductance circuit 14 through a spark gap 5. The Marx generator's capacitors are charged with a high voltage power supply 6. When the capacitors of the Marx generator 2 are charged, a pulse from a high voltage trigger unit 7 switches the Marx generator 2 and charges the transmission line 1. The transmission line 1 may also be implemented using ethylene glycol, water or oil as a dielectric fluid with a view toward providing controllable high power pulses to the capillary 4. When the line has been charged by the Marx generator 2, switch 5 breaks down and a capillary plasma is produced. An optional magnetic field producing means such as electromagnet 8 is positioned surrounding the capillary and is capable of producing a high intensity magnetic field. A magnetic field is produced by discharging a capacitor bank 9 through a triggered sparkgap 10. In those cases in which the magnetic field is used, a high voltage trigger unit 11 triggers the magnetic field switch 10 in anticipation of the firing of the Marx generator 2, which is triggered by trigger unit 7 through a delay generator 12, such that a capillary discharge will occur approximately at the peak intensity of the magnetic field generated by the electromagnet. Here again those skilled in this art will appreciate that many variations of the electrical configuration described in FIG. 2 are possible. One such variation could be the case wherein the transmission line is replaced by a bank of low inductance capacitors placed coaxially with the capillary structure. In all such cases however, the herein disclosed discharge pumped x-ray and extreme ultraviolet laser producing methods and apparatus can produce laser radiation from an apparatus which is much more compact than those previously known to this art, and hence which can be used in a wide variety of practical and scientific applications.

Thus having disclosed this invention, which is claimed is:

1. An electrically powered apparatus for generation of soft x-ray radiation, said apparatus comprising:
   (1) pressure vessel means for enclosing a capillary structure;
   (2) said capillary structure having (a) an inner surface of a material which is ionizable by an electric discharge and (b) a large length-to-diameter ratio;
   (3) a first electrode which: (a) is located in one end of the capillary structure, (b) has a first voltage, (c) is electrically connected to an electrical discharge circuit and (d) further comprising at least one hole for exiting laser radiation generated in said capillary structure;
   (4) a second electrode which: (1) is located in the other end of the capillary structure, (2) has a voltage different from the voltage of the voltage of the first electrode, and (3) is electrically connected to the electrical discharge circuit; and
   (5) an electrical discharge circuit having a low inductance circuit configuration for providing a current pulse which, when passed through said capillary structure having a large length-to-diameter ratio, generates both a plasma and a magnetic field which helps confine said plasma to a small diameter, achieve a high degree of ionization, promote generation of population inversions in said plasma and avoid trapping of lower laser level radiation by resonant absorption in the radial direction of said capillary so that said laser's lower levels can be depopulated by radiative decay and thereby serve to generate soft x-ray radiation.

2. The apparatus of claim 1 wherein the electrical discharge circuit further comprises at least one capacitor.

3. The apparatus of claim 1 wherein the electrical discharge circuit further comprises at least one electrical transmission line.

4. The apparatus of claim 1 wherein a material from which the inner surface of the capillary is made contains an atomic element which radiates laser light produced by said apparatus.

5. The apparatus of claim which further comprises a gas of a heavy atom which is capable of providing a large radiation cooling rate for the plasma excited in the capillary structure.

6. The apparatus of claim which further comprises a capillary containing a gaseous environment.

7. The apparatus of claim 1 which further comprises a pressure vessel containing a gaseous environment comprises of a mixture of gases which surrounds said apparatus.

8. The apparatus of claim 1 which further comprises means for producing a magnetic field around the capillary structure.

9. The apparatus of claim 1 which further comprises an electromagnet for producing a magnetic field around the capillary structure.

10. The apparatus of claim 1 which further comprises a reflecting mirror aligned with a hole in an electrode of the capillary in order to reflect laser radiation through the capillary at least once.

11. The apparatus of claim 1 which further comprises a reflecting mirror aligned with a hole in an electrode of the capillary in order to reflect laser radiation through the capillary substantially at the capillary axis.

12. An electrically powered apparatus for generation of extreme ultraviolet laser radiation, said apparatus comprising:
   (1) a pressure vessel means for enclosing a capillary structure;
   (2) said capillary structure having (a) an inner surface of a material which is ionizable by an electric discharge and (b) a large length-to-diameter ratio;
   (3) a first electrode which: (a) is located in one end of the capillary structure, (b) has a first voltage, (c) is electrically connected to an electrical discharge circuit and (d) further comprising at least one hole for exiting laser radiation generated in said capillary structure;
   (4) a second electrode which: (a) is located in the other end of the capillary structure, (b) has a voltage different from the voltage of the voltage of the first electrode and (c) is electrically connected to the electrical discharge circuit; and
   (5) an electrical discharge circuit having a low inductance circuit configuration for providing a current pulse which, when passed through said capillary structure having a large length-to-diameter ratio, generates both a plasma and a magnetic field which helps confine said plasma to a small diameter, achieve a high degree of ionization, promote generation of population inversions in said plasma and avoid trapping of lower laser level radiation by resonant absorption in the radial direction of sad capillary so that said laser's lower levels can be depopulated by radiative decay and thereby serve to generate soft x-ray radiation.

13. The apparatus of claim 12 wherein the electrical discharge circuit further comprises at least one capacitor.

14. The apparatus of claim 12 wherein the electrical discharge circuit further comprises at least one electrical transmission line.

15. The apparatus of claim 12 wherein a material from which the inner surface of the capillary is made contains an atomic element which radiates laser light produced by said apparatus.

16. The apparatus of claim 12 which further comprises a pressure vessel containing a gas of a heavy atom which is capable of providing a large radiation cooling rate for the plasma excited in the capillary structure.

17. The apparatus of claim 12 which further comprises a capillary containing a gaseous environment.

18. The apparatus of claim 12 which further comprises a pressure vessel containing a gaseous environment comprised of a mixture of gases which surrounds said apparatus.

19. The apparatus of claim 12 which further comprises means for producing a magnetic field around the capillary structure.

20. The apparatus of claim 12 which further comprises an electromagnet for producing a magnetic field around the capillary structure.

21. The apparatus of claim 12 which further comprises a reflecting mirror aligned with a hole in an electrode of the capillary in order to reflect laser radiation through the capillary at least once.

22. The apparatus of claim 12 which further comprises a reflecting mirror aligned with a hole in an electrode of the capillary in order to reflect laser radiation through the capillary substantially at the capillary axis.

23. A method for producing a soft x-ray laser from a capillary discharge plasma, said method comprising:
   (1) providing a pressure vessel environment means to contain a capillary geometry;
   (2) providing a capillary geometry having a large length-to-diameter ratio;
   (3) providing each end of said capillary geometry with an electrode capable of maintaining a voltage differential between the electrodes;
   (4) providing a low inductance circuit to provide high power energy deposition into the capillary;
   (5) an electrical discharge circuit having a low inductance circuit configuration for providing a current pulse which, when passed through said capillary structure having a large length-to-diameter ratio, generates both a plasma and a magnetic field which helps confine said plasma to a small diameter, achieve a high degree of ionization, promote generation of population inversions in said plasma and avoid trapping of lower laser level radiation by resonant absorption in the radial direction of said capillary so that said laser's lower levels can be depopulated by radiative decay and thereby serve to generate soft x-ray radiation.
   (6) controlling a population inversion created by a resulting election-ion recombination; and
   (7) directing a laser resulting from said population inversion.

24. The method of claim 23 wherein the inducing of the plasma process that generates the population inversion is by means of plasma inducing processes selected from the group consisting of electron-ion recombination, electron impact excitation and excitation of core excited states.

25. The method of claim 23 wherein the inducing of the plasma process that generates the population inversion is by means of electron-ion recombination and the plasma cools at a termination of a current pulse following electron heat conduction to an inner wall of the capillary geometry.

26. The method of claim 23 wherein the inducing of the plasma process that generates the population inversion is by means of electron-ion recombination and the plasma cools by radiation from a highly ionized material.

27. The method of claim 23 wherein the plasma process that generates the population inversion is electron-ion recombination and the laser results from a population inversion in a hydrogenic ion.

28. The method of claim 23 wherein the plasma process that generates the population inversion is electron-ion recombination and the laser results from a population inversion in a helium-like ion.

29. The method of claim 23 wherein the plasma process that generates the population inversion is electron-ion recombination and the laser results from a population inversion in a lithium-like ion.

30. The method of claim 23 wherein the laser is created by electron impact excitation and results from a population inversion in a nickel-like ion.

31. The method of claim 23 wherein the laser is created by electron impact excitation and the laser results from a population inversion in a neon-like ion.

32. The method of claim 23 wherein radiation from the plasma produces soft x-ray laser action by excitation of core excited states.

33. The method of claim 23 wherein the plasma is surrounded by a cooler plasma near an inner wall of the plasma geometry.

34. The method of claim 23 wherein diffusion of ions from the plasma into a cooler surrounding plasma creates the laser action.

35. A method for producing an extreme ultraviolet laser from a capillary discharge plasma, said method comprising:
(1) providing a pressure vessel environment means to contain a capillary geometry.
(2) providing a capillary geometry having a large length-to-diameter ratio;
(3) providing each end of said capillary geometry with an electrode capable of maintaining a voltage differential between the electrodes;
(4) providing a low inductance circuit to provide high power energy deposition into the capillary;
(5) discharging an electrical discharge circuit having a low inductance circuit configuration for providing a current pulse which, when passed through said capillary structure having a large length-to-diameter ratio, generates both a plasma and a magnetic field which helps confine said plasma to a small diameter, achieve a high degree of ionization, promote generation of population inversions in said plasma and avoid trapping of lower laser level radiation by resonant absorption in the radial direction of said capillary so that said laser's lower levels can be depopulated by radiative decay and thereby serve to generate soft x-ray radiation.

(6) controlling a population inversion created by a resulting electron-ion recombination; and
(7) directing a laser resulting from said population inversion.

36. The method of claim 35 wherein the inducing of the plasma process that generates the population inversion is by means of plasma inducing processes selected from the group consisting of electron-ion recombination, electron impact excitation and excitation of core excited states.

37. The method of claim 35 wherein the inducing of the plasma process that generates the population inversion is by means of electron-ion recombination and the plasma cools at a termination of a current pulse following electron heat conduction to an inner wall of the capillary geometry.

38. The method of claim 35 wherein the inducing of the plasma process that generates the population inversion is by means of electron-ion recombination and the plasma cools by radiation from a highly ionized material.

39. The method of claim 35 wherein the plasma process that generates a population inversion is electron-ion recombination and the laser results from a population inversion in a hydrogenic ion.

40. The method of claim 35 wherein the plasma process that generates a population inversion is electron-ion recombination and the laser results from a population inversion in a helium-like ion.

41. The method of claim 35 wherein the plasma process that generates a population inversion is electron-ion recombination and the laser results from a population inversion in a lithium-like ion.

42. The method of claim 35 wherein the laser is created by electron impact excitation and the laser results from a population inversion in a nickel-like ion.

43. The method of claim 35 wherein radiation from the plasma produces extreme ultraviolet laser action by excitation of core excited states.

44. The method of claim 35 wherein the plasma is surrounded by a cooler plasma near an inner wall of the plasma geometry.

45. The method of claim 35 wherein diffusion of ions from the plasma into a cooler surrounding plasma creates a laser action.

46. The method of claim 35 wherein the laser is created by electron impact excitation and the laser results from a population inversion in a neon-like ion.

* * * * *

UNITED STATES PATENT AND TRADEMARK OFFICE
CERTIFICATE OF CORRECTION

PATENT NO. : 4,937,832

DATED : June 26, 1990

INVENTOR(S) : Jorge J. Rocca

It is certified that error appears in the above-identified patent and that said Letters Patent is hereby corrected as shown below:

On the title page and Column 1, line 5, please insert the following language:

This invention was made with Government support under Grant No. ECS-8606226 awarded by the National Science Foundation. The United States government has certain rights in this invention.

Signed and Sealed this

Fifth Day of October, 1993

*Attest:*

BRUCE LEHMAN

*Attesting Officer*     *Commissioner of Patents and Trademarks*